(12) United States Patent
Min

(10) Patent No.: US 6,345,096 B1
(45) Date of Patent: Feb. 5, 2002

(54) CENTRAL OFFICE LINE INTERFACING CIRCUIT

(75) Inventor: Kyung-Hwa Min, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/946,079

(22) Filed: Oct. 7, 1997

(30) Foreign Application Priority Data

Oct. 9, 1996 (KR) .............................. 96-44856

(51) Int. Cl.[7] .............................................. H04M 1/00
(52) U.S. Cl. ........................... 379/387.01; 379/399.01
(58) Field of Search .............................. 379/82, 93.01, 379/100.01, 106, 164, 308, 253, 372, 373, 377, 386

(56) References Cited

U.S. PATENT DOCUMENTS

| 4,227,053 A | * | 10/1980 | Jacobson | ...................... 379/82 |
| 4,304,970 A | | 12/1981 | Fahey et al. | |
| 4,331,838 A | * | 5/1982 | Simokat | ...................... 379/373 |
| 4,731,827 A | | 3/1988 | Wood | |
| 4,748,659 A | * | 5/1988 | Kasahara et al. | ............ 379/253 |
| 4,998,271 A | | 3/1991 | Tortola et al. | |
| 5,335,271 A | | 8/1994 | Takato et al. | |
| 5,347,575 A | | 9/1994 | Naseer et al. | |
| 5,402,482 A | | 3/1995 | Minohara et al. | |
| 5,442,694 A | | 8/1995 | Chitrapu et al. | |
| 5,499,287 A | * | 3/1996 | Campbell et al. | ....... 379/100.01 |
| 5,594,788 A | | 1/1997 | Lin et al. | |
| 5,619,567 A | | 4/1997 | Apfel | |
| 5,659,602 A | | 8/1997 | Gay | |
| 5,889,841 A | * | 3/1999 | Shin | ........................ 379/93.01 |

* cited by examiner

Primary Examiner—Forester W. Isen
Assistant Examiner—Jefferey Harold
(74) Attorney, Agent, or Firm—Robert E. Bushnell, Esq.

(57) ABSTRACT

A central office line interface circuit commonly detects a status of a ring signal and a hook switch. The central office line interface circuit includes a hook switch connected to a telephone line, a ring signal path connected in parallel to the hook switch, and a detection circuit connected between a controller of the exchange and a node of the hook switch and the ring signal path, so as to detect a ring signal in an incoming call mode and to detect a hook off status in an outgoing call mode.

31 Claims, 4 Drawing Sheets

CENTRAL OFFICE LINE INTERFACING CIRCUIT

CLAIM OF PRIORITY

This application makes reference to, incorporates the same herein, and claims all benefits accruing under 35 U.S.C. §119 from an application for CENTRAL OFFICE LINE INTERFACING CIRCUIT earlier filed in the Korean Industrial Property Office on the Oct. 9, 1996 and there duly assigned Ser. No. 44856/1996.

BACKGROUND OF THE INVENTION

1. Technical Field

The present invention relates to a central office line interfacing circuit of an exchange, and more particularly to a circuit for detecting a hook-off and a ring signal.

2. Related Art

In general, an exchange such as a private branch exchange (PBX) or a key telephone system includes a ring detector for detecting a ring signal and a hook-on/off sensing circuit for sensing a hook-on/off status. A controller of the exchange checks a status of the signals generated from the ring detector and the hook-on/off sensing circuit to perform the incoming and outgoing call services.

In such a system of the prior art, if a telephone line connected between a central office exchange and a private branch exchange is in a normal state, turning on of a hook switch in an outgoing call mode results in formation of a central office line loop via the loop current from the central office exchange. However, when the telephone line is in an abnormal state, the central office line loop cannot be formed since the loop current from the central office exchange is cut off. This problem with prior art systems result from separate design of the ring detector and the hook-on/off sensor, such separate design resulting from the fact that the ring signal is typically a high voltage signal.

Thus, there is a need in the prior art for development of a central office line interface circuit which commonly detects a status of a ring signal and a hook switch in an exchange, and for commonly detecting the status of a ring signal and a hook switch in a telephone.

The following patents are considered to be representative of the prior art relative to the present invention, and are burdened by the disadvantage discussed above: U.S. Pat. No. 5,659,602 to Gay, entitled Telephone Apparatus For Caller ID, U.S. Pat. No. 5,619,567 to Apfel, entitled Variable DC Feed Characteristic In A Subscriber Line Interface Circuit, U.S. Pat. No. 5,594,788 to Lin et al., entitled Telephone System And Interface Device, U.S. Pat. No. 5,442,694 to Chitrapu et al., entitled Ring Tone Detection For A Telephone System, U.S. Pat. No. 5,402,482 to Minohara et al., entitled Ring Trip Deciding Circuit, U.S. Pat. No. 5,347,575 to Naseer et al., entitled Circuit To Detect The Hook Status And Ringing At The CPE End Of A Telephone Network, U.S. Pat. No. 5,335,271 to Takato et al., entitled Ring Trip Detection Circuit, U.S. Pat. No. 4,998,271 to Tortola et al., entitled Telephone Accessory, U.S. Pat. No. 4,731,827 to Wood, entitled Interswitch Line circuit, and U.S. Pat. No. 4,304,970 to Fahey et al., entitled Telephone Status Monitor Apparatus.

SUMMARY OF THE INVENTION

It is therefore an object of the present invention to provide a central office line interface circuit for commonly detecting a status of a ring signal and a hook switch in an exchange.

It is another object of the present invention to provide a central office line interface circuit for commonly detecting a status of a ring signal and a hook switch in a telephone.

According to an aspect of the present invention, a central office line interface circuit of an exchange includes a hook switch connected to a telephone line, a ring signal path connected in parallel to the hook switch, and a detection circuit connected between a controller of the exchange and a node of the hook switch and the ring signal path, so as to detect a ring signal in an incoming call mode and detect a hook off status in an outgoing call mode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
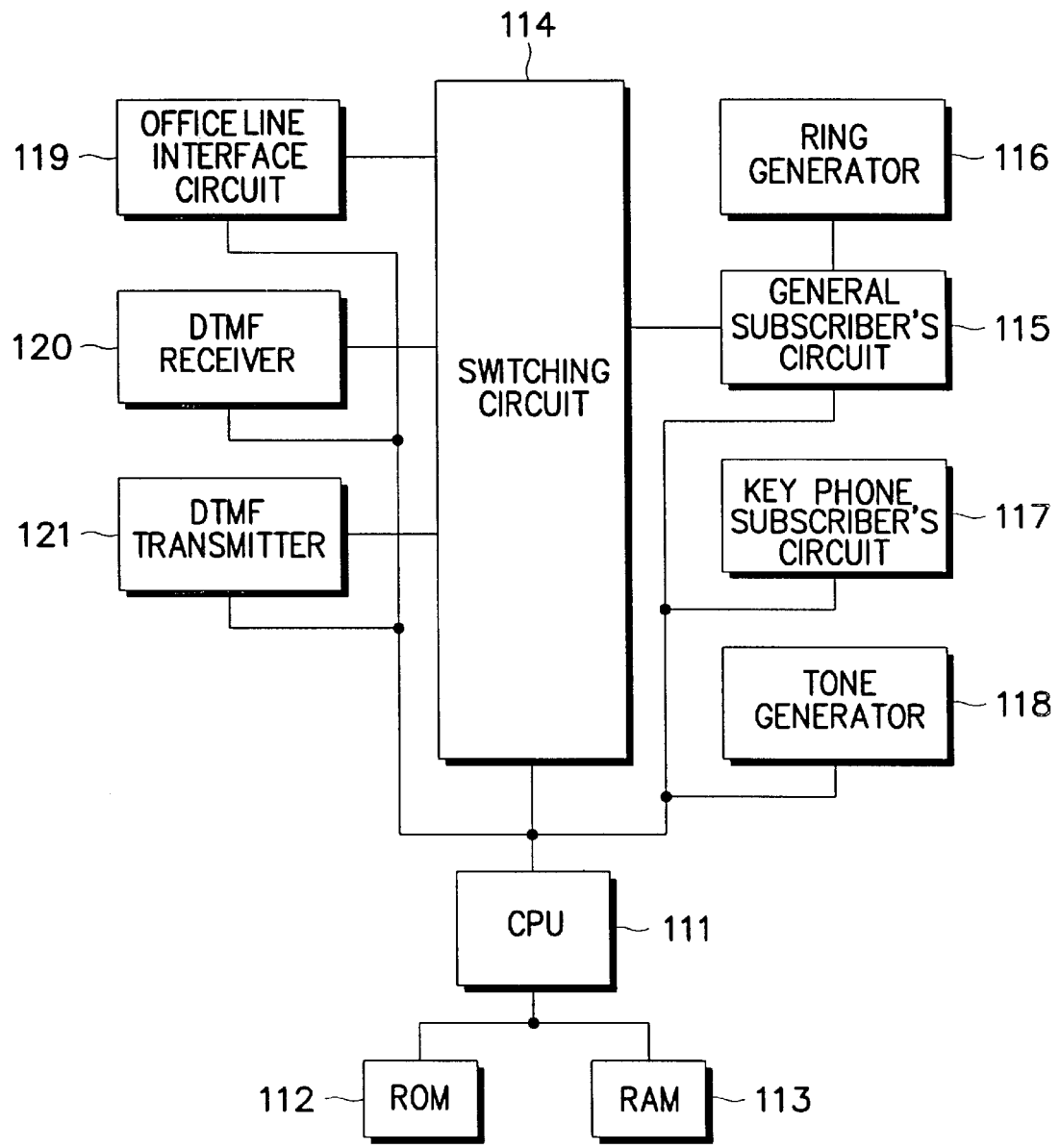
FIG. 1 is a block diagram of a key telephone system.

A preferred embodiment of the present invention will be described in detail hereinbelow with reference to the attached drawings, in which the like reference numerals represent the like elements.

FIG. 1 illustrates a block diagram of a key telephone system, in which a CPU (Central Processing Unit) 111 controls an overall operation of the key telephone system so as to control switching of the key telephone system and provide a user with various services. A ROM (Read Only Memory) 112 stores a program of the CPU 111 for processing a basic call and performing various functions, and stores initial service data. A RAM (Random Access Memory) 113 temporarily stores data generated in the course of executing the program. A switching circuit 114 switches various tone and voice data under the control of the CPU 111. A general subscriber's circuit 115 provides a general telephone (not shown) with a loop current (or talking current), and interfaces a signal between the general telephone and the switching circuit 114 under the control of the CPU 111. A ring generator 116 generates a ring signal to provide a subscriber's line with the ring signal. A key phone subscriber's circuit 117 transmits and receives data to/from the key telephone (not shown) under the control of the CPU 111. Further, the key phone subscriber's circuit 117 provides the key telephone with loop current and interfaces a signal between the key telephone and the switching circuit 114. Here, the key telephone and the general telephone are extension line subscribers. Further, the extension line subscriber, (i.e., the general subscriber and the key telephone subscriber) are connected to the general subscriber's circuit 115 and the key phone subscriber's circuit 117, respectively, via the subscriber's lines. A tone generator 118 generates various tone signals and provides the switching circuit 114 with the tone signals under the control of the CPU 111. A central office line interface circuit 119 seizes a central office line to form a communication path, and interfaces a signal between the central office line and the switching circuit 114 under the control of the CPU 111. Here, the central office line refers to a line connecting the central office line interface circuit 119 to a central office exchange. A DTMF (Dual Tone Multi-Frequency) receiver 120 analyzes a DTMF signal received from the switching circuit 114 and converts it into digital data to provide the CPU 111 with the converted digital data. The DTMF signal applied to the DTMF receiver 120 from the switching circuit 114 is a telephone number that the extension line subscriber or a central office line subscriber has dialed. A DTMF transmitter 121 converts digital data from the CPU 111 into a DTMF signal to provide the switching circuit 114 with the DTMF signal. The DTMF signal generated from the DTMF transmitter 121 is a telephone number for a central office line subscriber as dialed by the extension line subscriber.

Figure 2:
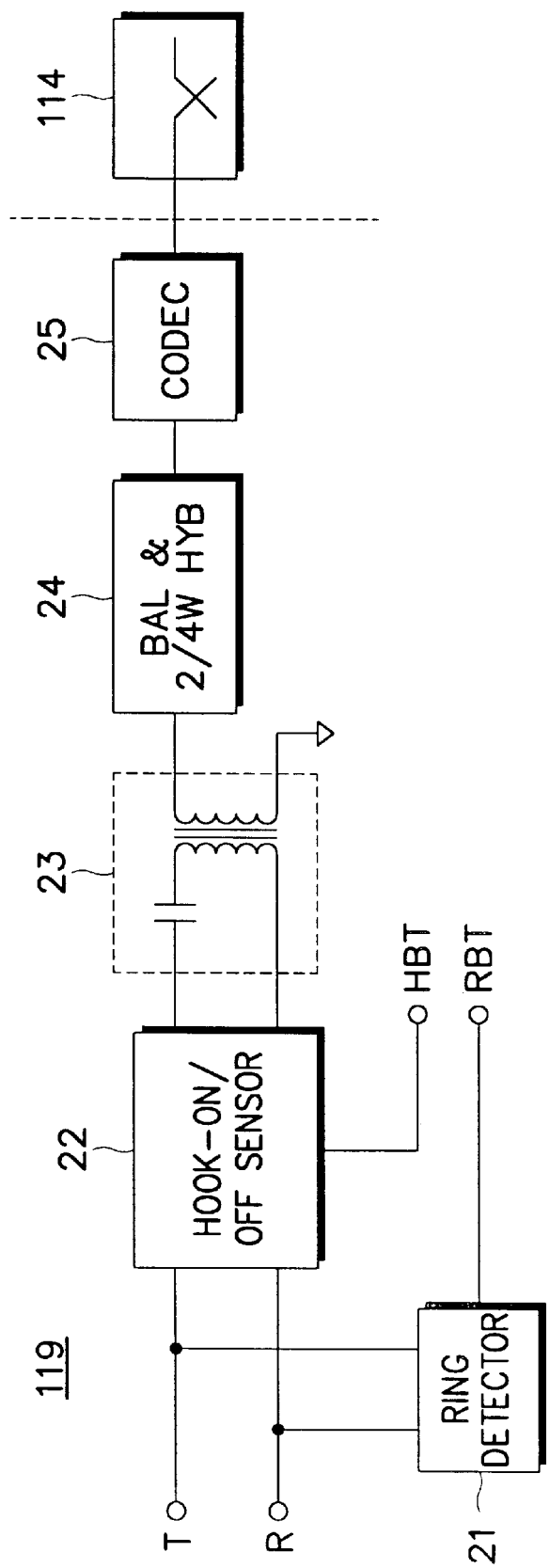
FIG. 2 is a detailed block diagram of a central office line interface circuit according to the prior art.

FIG. 2 illustrates a detailed block diagram of the central office line interface circuit 119 according to the prior art, in which the central office line interface circuit 119 separately includes a ring detector 21 and a hook-on/off sensor 22. Referring to FIG. 2, the ring detector 21 and the hook-on/off sensor 22 are connected in parallel to a telephone line (T, R), and output terminals thereof are connected to the CPU 111 of FIG. 1. Upon receiving an incoming call from the central office exchange, the ring detector 21 (FIG. 2) detects a ring signal on the telephone line, and sets a ring detection bit RBT for application to the CPU 111 (FIG. 1). Then, the CPU 111 controls the subscriber's circuit 115 or 117 to switch (or connect) the incoming call. Thereafter, if a corresponding subscriber off-hooks the telephone, the switching circuit 114 connects the corresponding central office line port and a subscriber port to service the incoming call under the control of the CPU 111.

Further, if a hook switch is turned on in an outgoing call mode, the CPU 111 detects a status variation of the corresponding subscriber port, and controls the switching circuit 114 to connect the subscriber port to the DTMF receiver 121. Thereafter, the CPU 111 checks the telephone number data generated by the DTMF receiver 121 to turn on the hook switch connected to the central office line port of the central office line interface circuit 119. At the moment, if the telephone line connected between the central office exchange and the private branch exchange is in a normal state, a central office line loop will be formed by the loop current from the central office exchange. Upon detecting the communication loop formed by the off-hook status of the hook switch, the hook-on/off sensor 22 (FIG. 2) sets a hook-on/off sensing bit HBT. The CPU 111 (FIG. 1) receives the hook-on/off sensing bit HBT and controls the switching circuit 114 to connect the corresponding subscriber port to the central office line port so as to service the outgoing call.

However, when the telephone line is in an abnormal state, the central office line loop will not be formed since the loop current from the central office exchange is cut off. In such a case, the hook-on/off sensor 22 (FIG. 2) resets the hook-on/off bit HBT. Then, upon detecting the abnormal status of the telephone line, the CPU 111 (FIG. 1) accesses another central office line and repeatedly executes the above stated operation to service the outgoing call.

The reason that the ring detector 21 (FIG. 2) and the hook-on/off sensor 22 are separately designed in the conventional central office line interface circuit 119 is because the ring signal is a high voltage signal. Commonly, the ring signal has a voltage of 85V and a frequency of 20–25 Hz.

Further, in order to realize an interface function between the central office line interface circuit 119 (FIG. 1) and the CPU 111, the exchange should include an opto-coupler or a decoding circuit for driving the outputs of the ring detector 21 (FIG. 2) and the hook-on/off sensor 22. Where the opto-coupler and decoding circuit are implemented in a custom IC, the number of pins increases in proportion to the number of ports designed on the board, which results in an increase in the package size of the custom IC.

Moreover, since the conventional central office line interface circuit uses high voltage elements, the exchange has a short average life span and an increased size. Therefore, it is difficult to realize a compact and light exchange. In order to solve such a problem, it is necessary that the central office line interface circuit 119 (FIG. 2) include a single detection circuit for commonly detecting the ring signal and the hook-on/off status.

Figure 3:
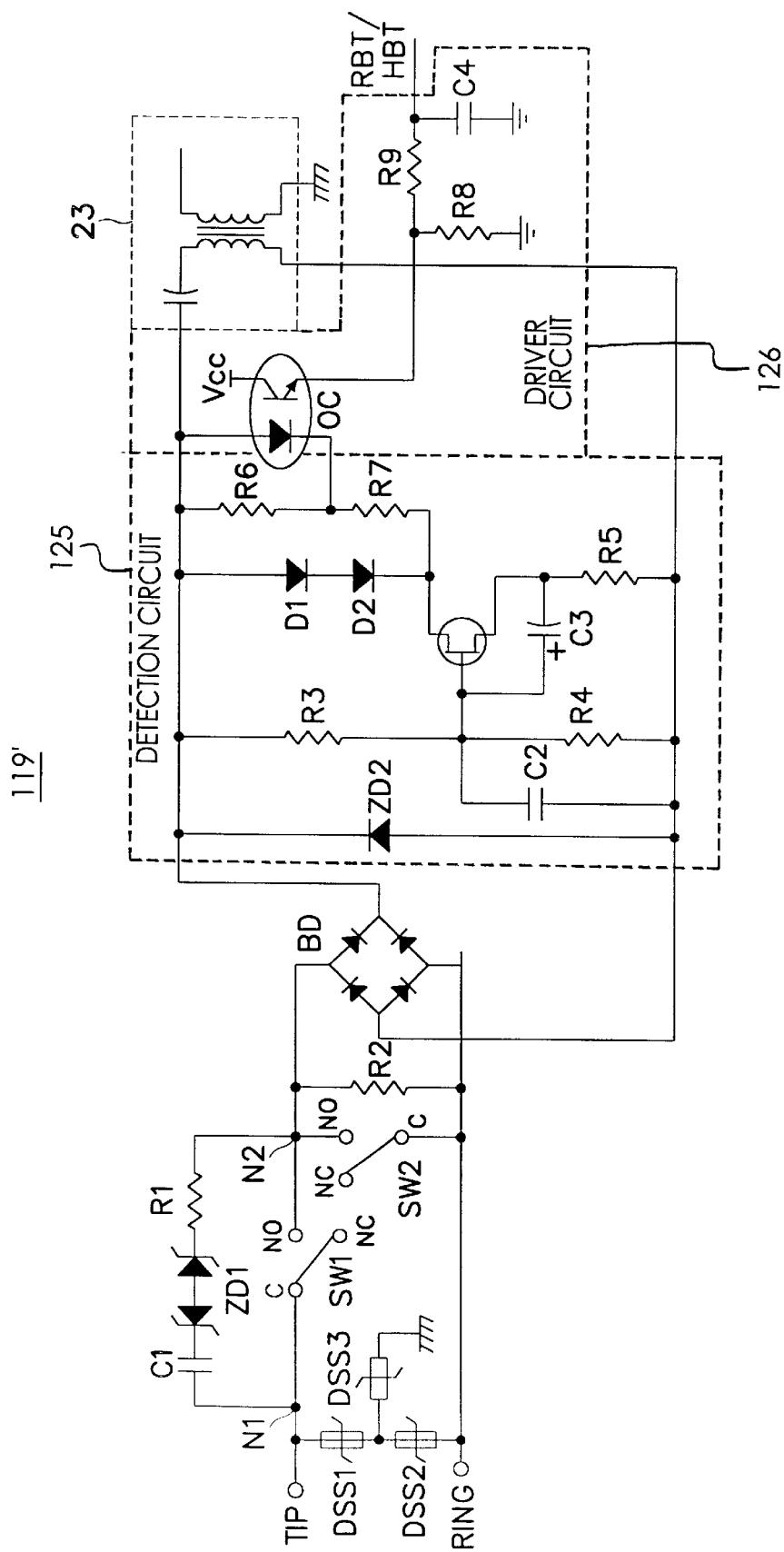
FIG. 3 is a detailed circuit diagram of a central office line interface circuit according to an embodiment of the present invention.

Referring to FIG. 3, a central office line interface circuit 119' according to the present invention includes first to third arresters DSS1–DSS3 functioning as a surge protector, in which the first and second arresters DSS1 and DSS2 are connected in series between a tip terminal TIP and a ring terminal RING of the telephone line, and the third arrester DSS3 is connected between ground and a node of the arresters DSS1 and DSS2. A hook switch SW1 connected between a node N1 and a node N2 is switchable under a control of the CPU 111. Further, a series circuit formed by capacitor C1, back-to-back connected Zener diode ZD1, and a resistor R1 is connected in parallel with the hook switch SW1 so as to form a ring signal path through which a ring signal passes. A bridge diode BD is connected between the node N2 and the ring terminal RING of the telephone line to rectify the signal on the telephone line.

A Zener diode ZD2, capacitors C2 and C3, resistors R3–R7, diodes D1 and D2, and a transistor Q1 constitute a detection circuit 125 for commonly detecting a status of the ring signal and the hook switch SW1. An opto-coupler OC, resistors R8 and R9, and a capacitor C4 constitutes a driver circuit 126 which is arranged between the detection circuit and the CPU 111. The driver circuit 126 converts an output level of the detection circuit 125 into a DC supply voltage level, and provides the CPU 111 with the converted output voltage thereof.

Referring to FIGS. 1 and 3, operation of the central office line interface circuit 119' according to the present invention will be described in detail hereinbelow. First, the ring signal is normally an AC signal with 78–85 Vrms. Further, in the case of providing a ring signal of an incoming call to a telephone or an exchange, the central office exchange overlaps the ring signal with a loop current of DC 48V and applies it to the central office line interface circuit 119' of the corresponding exchange. In an incoming call mode, the CPU 111 of the exchange keeps the hook switch SW1 turned off, and the received ring signal is applied to the bridge diode BD through the capacitor C1, the back-to-back connected Zener diode ZD1, and the resistor R1. Here, it is assumed that the back-to-back connected Zener diode ZD1 is designed to have a turn-on voltage of 68V. On the contrary, in an outgoing call mode, the CPU 111 turns on the hook switch SW1 to connect the telephone line to the central office line interface circuit 119'.

In the incoming call mode, if the ring signal is not received, no signal will be applied to the bridge diode BD, and thus the transistor Q1 will be turned off. As a result, the opto-coupler OC is also turned off, and the ring detection bit RBT and the hook-on/off detection bit HBT are reset to the logic low state.

After a short time, upon receiving the ring signal from the central office exchange, the hook switch SW1 is turned off. The received ring signal is applied to the bridge diode BD via the Zener diode ZD1, and is rectified by the bridge diode BD. The resistors R3 and R4 divide the rectified voltage output from the bridge diode BD to provide the transistor Q1 with a bias voltage. The resistors R3 and R4 have high resistances, so that a current supplied to a base of the transistor Q1 is very small. Then, the transistor Q1 is turned on, thereby forming a current loop by way of the diodes D1 and D2, the transistor Q1, and the resistor R5. At the moment, another current loop is formed through the resistors R6 and R7. Here, the diodes D1 and D2 and the resistor R5 control the amount of current flowing through the transistor Q1. Further, the resistors R6 and R7 control an amount of current flowing through a light emitting diode (LED) of the opto-coupler OC.

If the transistor Q1 is turned on, the opto-coupler OC will also be turned on, thereby generating the ring detection signal RBT of DC 5V. Here, the resistors R8 and R9 and the capacitor C4 are adjusted to have appropriate resistances and capacitance, respectively, so as to detect a cadence of the logic high ring detection bit RBT.

Although the sine wave ring signal is full-wave rectified by the bridge diode BD, a ripple component remains. The ripple component is removed by a Schmitt trigger circuit compose of the diodes D1 and D2, the transistor Q1, the capacitor C3 and the resistor R5. If the ring detection bit RBT is set, the CPU 111 will detect the ring detection bit RBT and assume an incoming call mode.

Operation of detecting a hook-on/off status will be described in detail hereinbelow. If a subscriber off-hooks the telephone, the CPU 111 will control the switching circuit 114 to connect the DTMF receiver 120 to the corresponding subscriber's circuit 115 or 117. Then, the CPU 111 analyzes an output of the DTMF receiver 120. As the result, if the received data are data for occupying (or seizing) the central office line, the CPU 111 will turn on the hook switch SW1 of the central office line interface circuit 119. At that moment, if the telephone line is in a normal state, a current loop will be formed by the loop current supplied from the central office exchange. That is, the loop current supplied from the central office exchange is applied to the bridge diode BD through the hook switch SW1. Therefore, a current loop is formed through the bridge diode BD→the resistor R3→the resistor R4→the bridge diode BD. Then, the transistor Q1 is turned on, forming a current loop through itself As a result, the opto-coupler OC will also be turned on, thereby generating the hook-on/off detection bit HBT of DC 5V.

Since the CPU 111 analyzes the status of the ring detection bit RBT and the hook-on/off detection bit HBT generated from the same terminal, a detection program stored in the ROM 112 should be changed accordingly. The ring signal and the hook-on/off signal are not generated at the same time on the signal processing sequence. Therefore, it is possible to process the ring detection bit RBT and the hook-on/off detection bit HBT by using a single bit. In that case, if the DC supply voltage with a ring cadence cycle is supplied during the call waiting state, the CPU 111 will determine that the ring detection bit RBT is set. Further, if the DC supply voltage is supplied after turning on the hook switch SW1, the CPU 111 will determine that the hook-on/off detection signal HBT is set. The detection circuit and the driving circuit operate even when transmitting a dial pulse under the state that the hook switch SW1 is turned on. Accordingly, the CPU 111 should be programmed such that the DC voltage sensed during transmission of the dial pulse should be ignored.

If the incoming call service or outgoing call service is processed in this manner, the central office line interface circuit 119' will receive or transmit the signal on the telephone line via the bridge diode BD and a transformer 23.

As described in the foregoing, the central office line interface circuit 119' according to the present invention uses a common detection circuit for detecting the status of the ring signal and the hook-on/off to generate the ring detection bit RBT and the hook-on/off detection bit HBT. It can be understood that, even though applied to a telephone, the detection circuit will have the same effect. That is, if a telephone line interface circuit includes the detection circuit in a telephone having a controller, the controller of the telephone can determine the ring signal status and the hook-on/off status.

Figure 4:
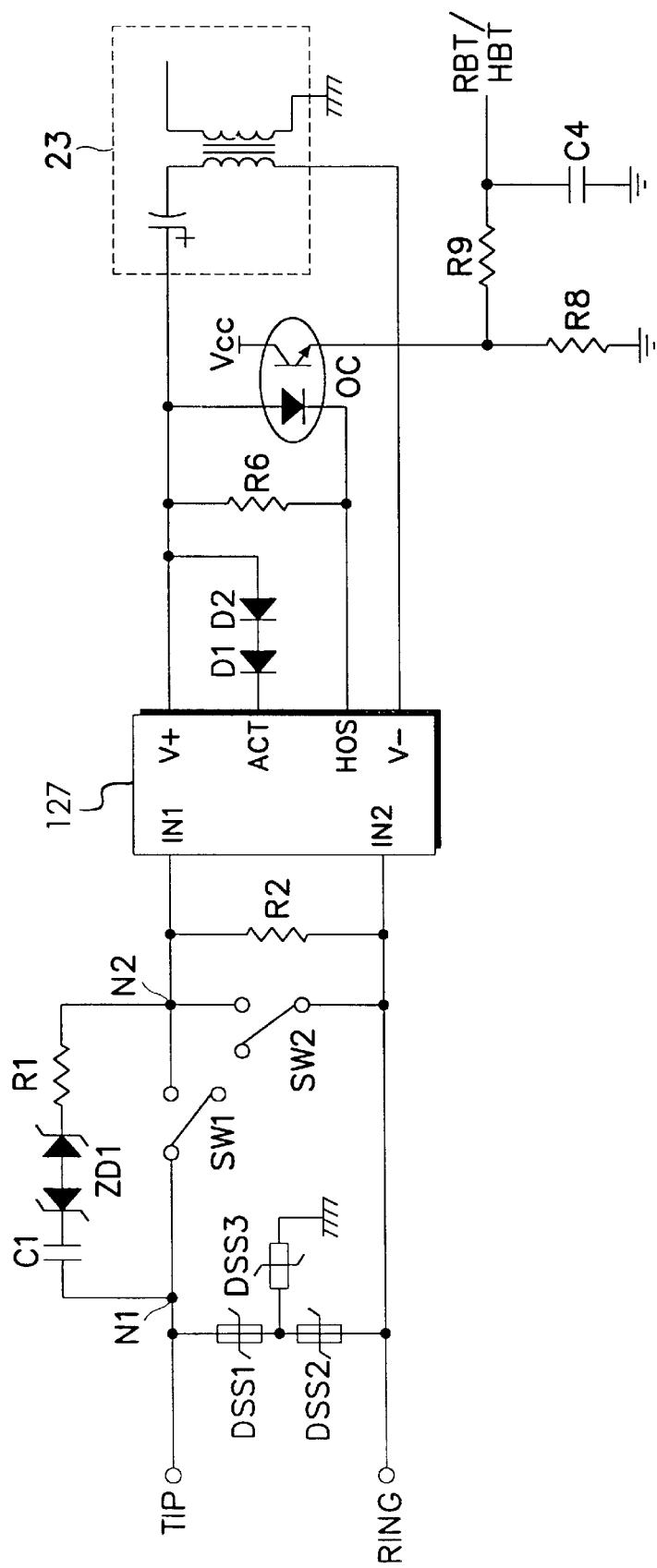
FIG. 4 is a detailed circuit diagram of the central office line interface circuit according to another embodiment of the present invention.

Referring to FIG. 4, the above described detection circuit for commonly detecting the ring signal status and the hook-on/off status can be easily implemented in a single integrated circuit (IC) 127. That is, IC 127 includes all of the previously described elements of the detector circuit 125, except for diodes D1 and D2 and resistor R6. Accordingly, the central office line interface circuit 119' of the exchange or the telephone line interface circuit of the telephone can detect the ring signal with the less number of high voltage elements, thereby resulting in a decrease in cost.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A central office line interface circuit of an exchange having a controller, said circuit comprising:
    a hook switch having a first node connected to a telephone line and having a second node located on a side of said hook switch remote from said first node;
    a ring signal path connected between said first and second nodes and in parallel with said hook switch; and
    a detection circuit connected between the controller of the exchange, on the one hand, and the second node of the hook switch and the ring signal path, on the other hand, for detecting a ring signal in an incoming call mode, and for detecting a hook-off status in an outgoing call mode.

2. A central office line interface circuit according to claim 1, wherein said detection circuit comprises a Schmitt trigger circuit.

3. A central office line interface circuit of an exchange having a controller, said circuit comprising:
    a hook switch connected to a telephone line and having a node;
    a ring signal path connected in parallel with said hook switch; and
    a detection circuit connected between the controller of the exchange, on the one hand, and the node of the hook switch and the ring signal path, on the other hand, for detecting a ring signal in an incoming call mode, and for detecting a hook-off status in an outgoing call mode;
    wherein said detection circuit comprises a Zener diode, first and second resistors connected in parallel with said Zener diode, and a transistor having a base connected to a junction between said first and second resistors.

4. A central office line interface circuit according to claim 3, wherein said detection circuit further comprises a t leas t one diode connected between an end of said first resistor remote from said junction and an output of said transistor.

5. A central office line interface circuit according to claim 4, wherein said detection circuit further comprises a capacitor connected between said base of said transistor and an additional output of said transistor.

6. A central office line interface circuit according to claim 4, wherein said detection circuit further comprises at least one resistor connected between an end of said first resistor remote from said junction and said output of said transistor.

7. A central office line interface circuit according to claim 3, wherein said detection circuit further comprises a capacitor connected between a base of said transistor and an input side of said Zener diode.

8. A central office line interface circuit according to claim 7, further comprising a third resistor connected in parallel with said capacitor.

9. A central office line interface circuit according to claim 7, wherein said detection circuit further comprises an additional capacitor connected in series with a third resistor, said additional capacitor and said third resistor being connected in parallel with said capacitor.

10. A telephone line interface circuit of a telephone for use with a controller, said circuit comprising:
   a hook switch having a first node connected to a telephone line and having a second node located on a side of said hook switch remote from said first node;
   a ring signal path connected between said first and second nodes and in parallel with said hook switch; and
   a detection circuit connected between said controller, on the one hand, and the second node of the hook switch and the ring signal path, on the other hand, for detecting a ring signal in an incoming call mode, and for detecting a hook off status in an outgoing call mode.

11. A telephone line interface circuit according to claim 10, wherein said detection circuit comprises a Schmitt trigger circuit.

12. A telephone line interface circuit of a telephone for use with a controller, said circuit comprising:
   a hook switch connected to a telephone line and having a node;
   a ring signal path connected in parallel with said hook switch; and
   a detection circuit connected between said controller, on the one hand, and the node of the hook switch and the ring signal path, on the other hand, for detecting a ring signal in an incoming call mode, and for detecting a hook off status in an outgoing call mode;
   wherein said detection circuit comprises a Zener diode, first and second resistors connected in parallel with said Zener diode, and a transistor having a base connected to a junction between said first and second resistors.

13. A telephone line interface circuit according to claim 12, wherein said detection circuit further comprises at least one diode connected between an end of said first resistor remote from said junction and an output of said transistor.

14. A telephone line interface circuit according to claim 13, wherein said detection circuit further comprises a capacitor connected between said base of said transistor and an additional output of said transistor.

15. A telephone line interface circuit according to claim 13, wherein said detection circuit further comprises at least one resistor connected between an end of said first resistor remote from said junction and said output of said transistor.

16. A telephone line interface circuit according to claim 12, wherein said detection circuit further comprises a capacitor connected between a base of said transistor and an input side of said Zener diode.

17. A telephone line interface circuit according to claim 16, further comprising a third resistor connected in parallel with said capacitor.

18. A telephone line interface circuit according to claim 16, wherein said detection circuit further comprises an additional capacitor connected in series with a third resistor, said additional capacitor and said third resistor being connected in parallel with said capacitor.

19. A telephone line interface circuit for use with a telephone line and a controller, said circuit comprising:
   a hook switch connected between a first node which is connected to the telephone line and a second node located on a side of said hook switch remote from said telephone line, said hook switch being switchable under control of the controller;
   a ring signal path through which a ring signal passes, said ring signal path being connected between said first and second nodes and in parallel with said hook switch;
   a rectifying circuit connected to the second node and producing an output having an output level;
   a detection circuit connected to the rectifying circuit for producing an output having an output level, said detection circuit having a switching element which is switchable based on the output level of said rectifying circuit so as to detect a ring signal status and a hook switch status; and
   a driving circuit connected between said detection circuit and the controller for converting the output level of the detection circuit into a DC power supply level.

20. A telephone line interface circuit according to claim 19, wherein said telephone line interface circuit comprises a telephone line interface for a central office line interface circuit.

21. A telephone line interface circuit according to claim 19, wherein said telephone line interface circuit comprises a telephone line interface for a telephone.

22. A telephone line interface circuit according to claim 21, wherein said detection circuit comprises a Schmitt trigger circuit.

23. A telephone line interface circuit for use with a telephone line and a controller, said circuit comprising:
   a hook switch connected between a first node and a second node of the telephone line, said hook switch being switchable under control of the controller;
   a ring signal path through which a ring signal passes, said ring signal path being connected in parallel with said hook switch at the first and second nodes of said telephone line;
   a rectifying circuit connected to the second node and producing an output having an output level;
   a detection circuit connected to the rectifying circuit for producing an output having an output level, said detection circuit having a switching element which is switchable based on the output level of said rectifying circuit so as to detect a ring signal status and a hook switch status; and
   a driving circuit connected between said detection circuit and the controller for converting the output level of the detection circuit into a DC power supply level;
   wherein said detection circuit comprises a Zener diode, first and second resistors connected in parallel with said Zener diode, and a transistor having a base connected to a junction between said first and second resistors.

24. A telephone line interface circuit according to claim 23, wherein said detection circuit further comprises at least one diode connected between an end of said first resistor remote from said junction and an output of said transistor.

25. A telephone line interface circuit according to claim 24, wherein said detection circuit further comprises a capacitor connected between said base of said transistor and an additional output of said transistor.

26. A telephone line interface circuit according to claim 24, wherein said detection circuit further comprises at least one resistor connected between an end of said first resistor remote from said junction and said output of said transistor.

27. A telephone line interface circuit according to claim 23, wherein said detection circuit further comprises a capacitor connected between a base of said transistor and an input side of said Zener diode.

28. A telephone line interface circuit according to claim 27, further comprising a third resistor connected in parallel with said capacitor.

29. A telephone line interface circuit according to claim 27, wherein said detection circuit further comprises an additional capacitor connected in series with a third resistor, said additional capacitor and said third resistor being connected in parallel with said capacitor.

30. A telephone line interface circuit according to claim 21, wherein said rectifying circuit comprises a bridge diode.

31. A telephone line interface circuit according to claim 19, wherein said rectifying circuit comprises a bridge diode.

* * * * *